United States Patent
Yamakage et al.

(10) Patent No.: US 7,518,974 B2
(45) Date of Patent: Apr. 14, 2009

(54) RECORDING AND REPRODUCING APPARATUS

(75) Inventors: Yuzuru Yamakage, Kawasaki (JP); Toshikazu Kanaoka, Kawasaki (JP); Akiyoshi Uchida, Kawasaki (JP); Kazushi Uno, Kawasaki (JP); Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 649 days.

(21) Appl. No.: 11/342,835

(22) Filed: Jan. 31, 2006

(65) Prior Publication Data

US 2007/0091769 A1    Apr. 26, 2007

(30) Foreign Application Priority Data

Oct. 25, 2005    (JP)    ............................. 2005-310325

(51) Int. Cl.
G11B 7/00    (2006.01)
(52) U.S. Cl. .................................. 369/103; 369/112.01
(58) Field of Classification Search ........................ None
See application file for complete search history.

(56) References Cited

U.S. PATENT DOCUMENTS 6,108,110 A    8/2000    Orlov et al.

FOREIGN PATENT DOCUMENTS

EP    1 585 117    10/2005
JP    2002-216359    8/2002

OTHER PUBLICATIONS

M. Bunsen et al., "Hologram Multiplexing with Photorefractive Beam-Fanning Speckle", Optics Communications, vol. 235, No. 1-3, pp. 41-47, May 1, 2004.
European Search Report issued Feb. 6, 2008 for corresponding European Patent Application No. 06250508.6.

*Primary Examiner*—Paul Huber
(74) *Attorney, Agent, or Firm*—Staas & Halsey LLP

(57) ABSTRACT

A recording and reproducing apparatus includes a light source to emit a laser beam, an information light beam irradiation unit to irradiate a medium with an information light beam, a reference light beam irradiation unit to irradiate the medium with a reference light beam so as to form a specific speckle pattern on the medium. The reference light beam irradiation unit comprises a diffusion board provided in the way of a light path through which the laser beam is passed and generating the reference light beam, a rotation controller to rotate the diffusion board, and an identification information detector to detect identification information previously formed on a surface of the diffusion board. The diffusion board comprises a plurality of encode storage regions in which different identification information is formed and a plurality of diffusion pattern generation regions specified by the identification information. A position of the diffusion board is controlled based on the detected identification information such that a desired diffusion pattern generation region comes to a position through which the laser beam is passed while the laser beam is outputted.

6 Claims, 13 Drawing Sheets

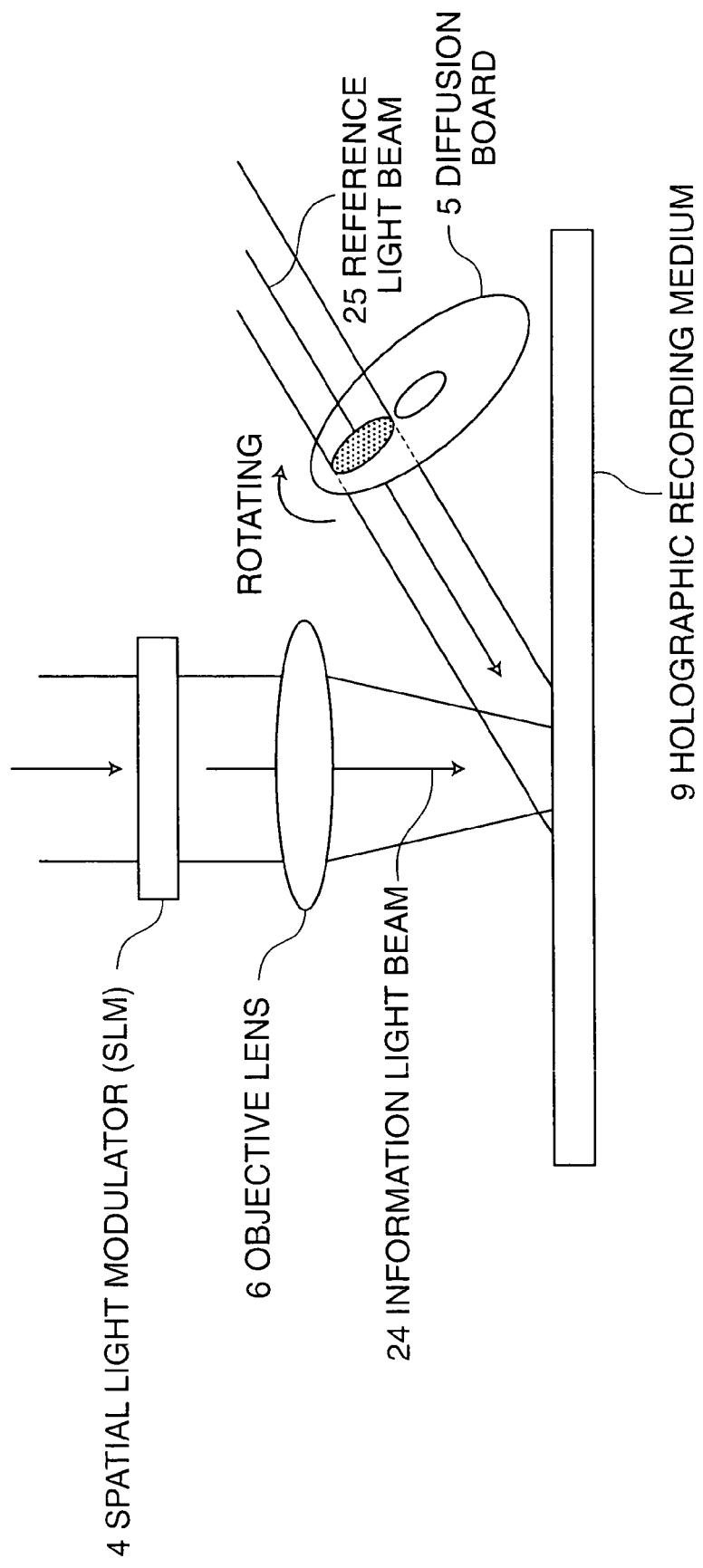

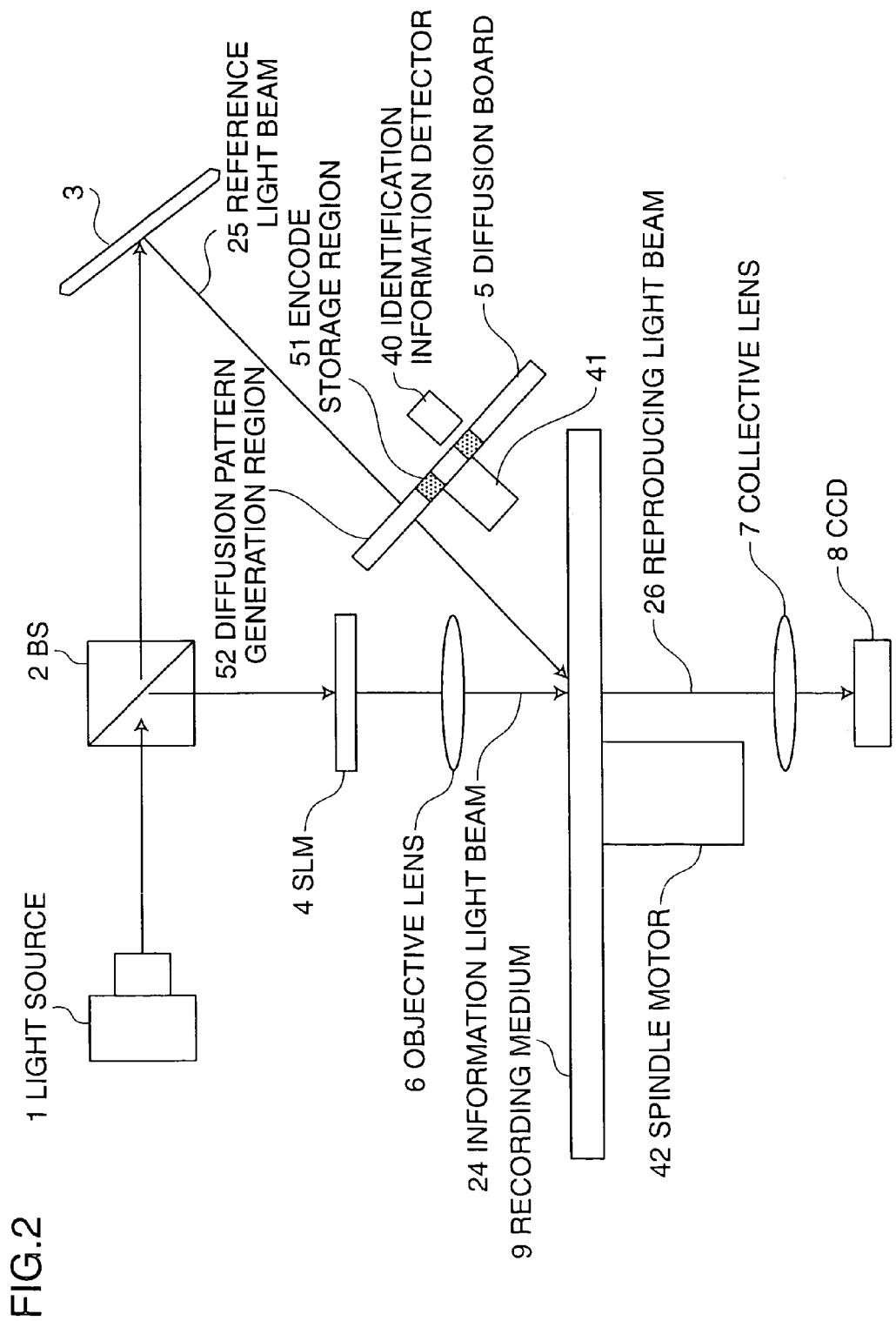

52 DIFFUSION PATTERN GENERATION REGION

51 ENCODE STORAGE REGION

52 DIFFUSION PATTERN GENERATION REGION

51 ENCODE STORAGE REGION

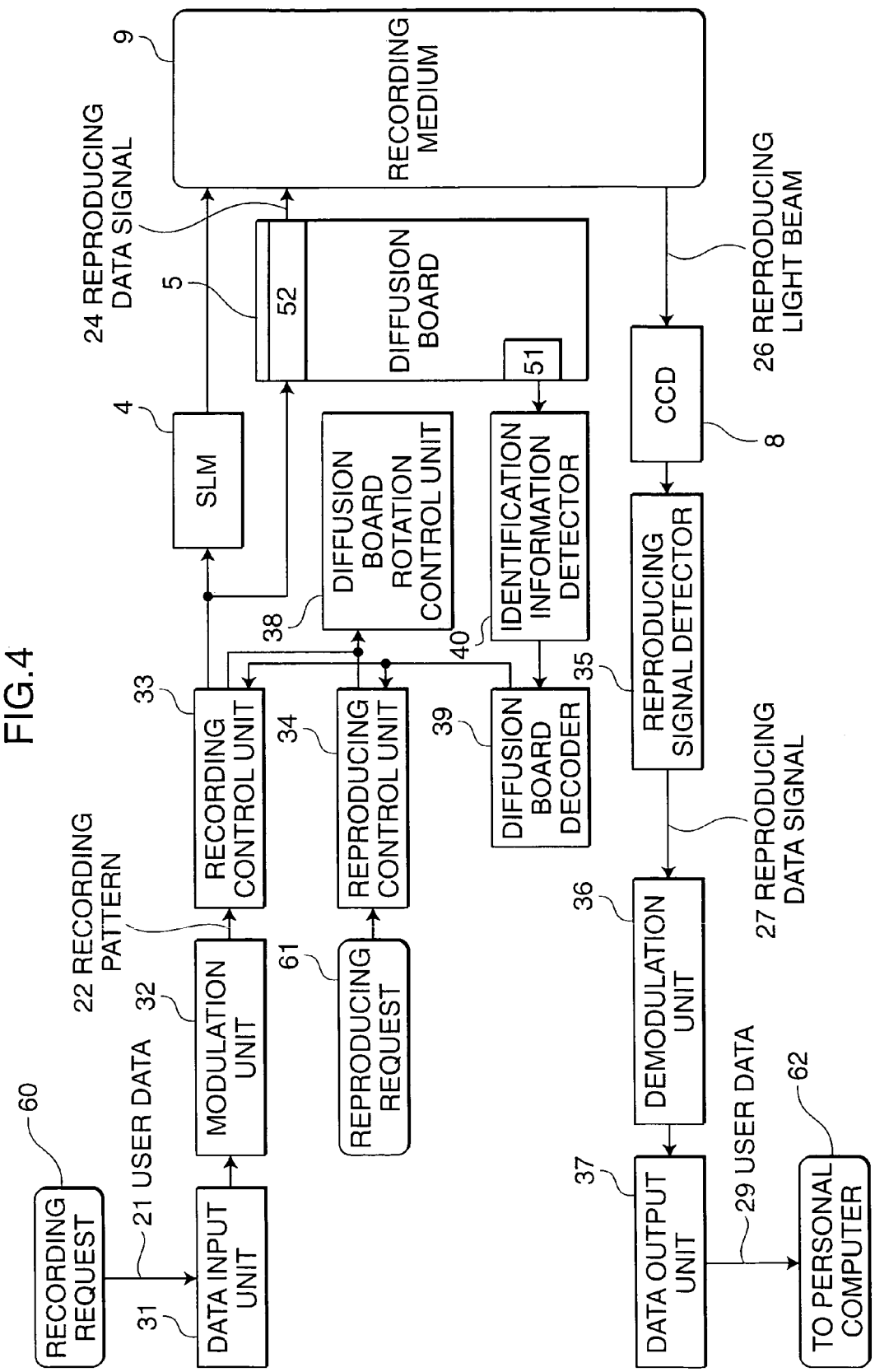

FIG.6
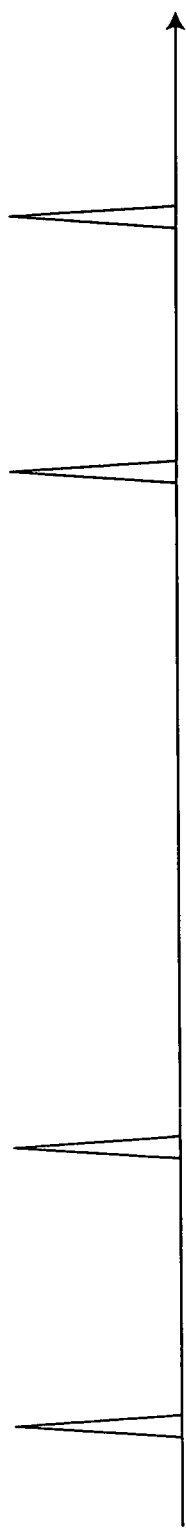
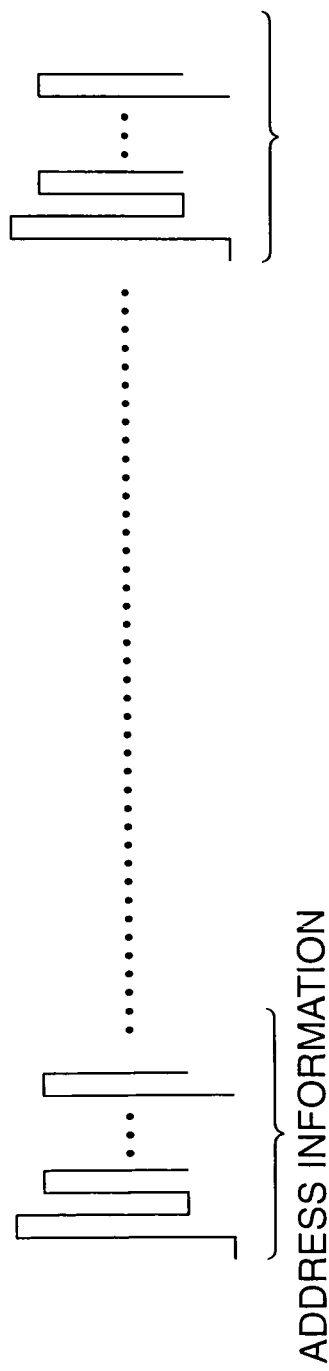

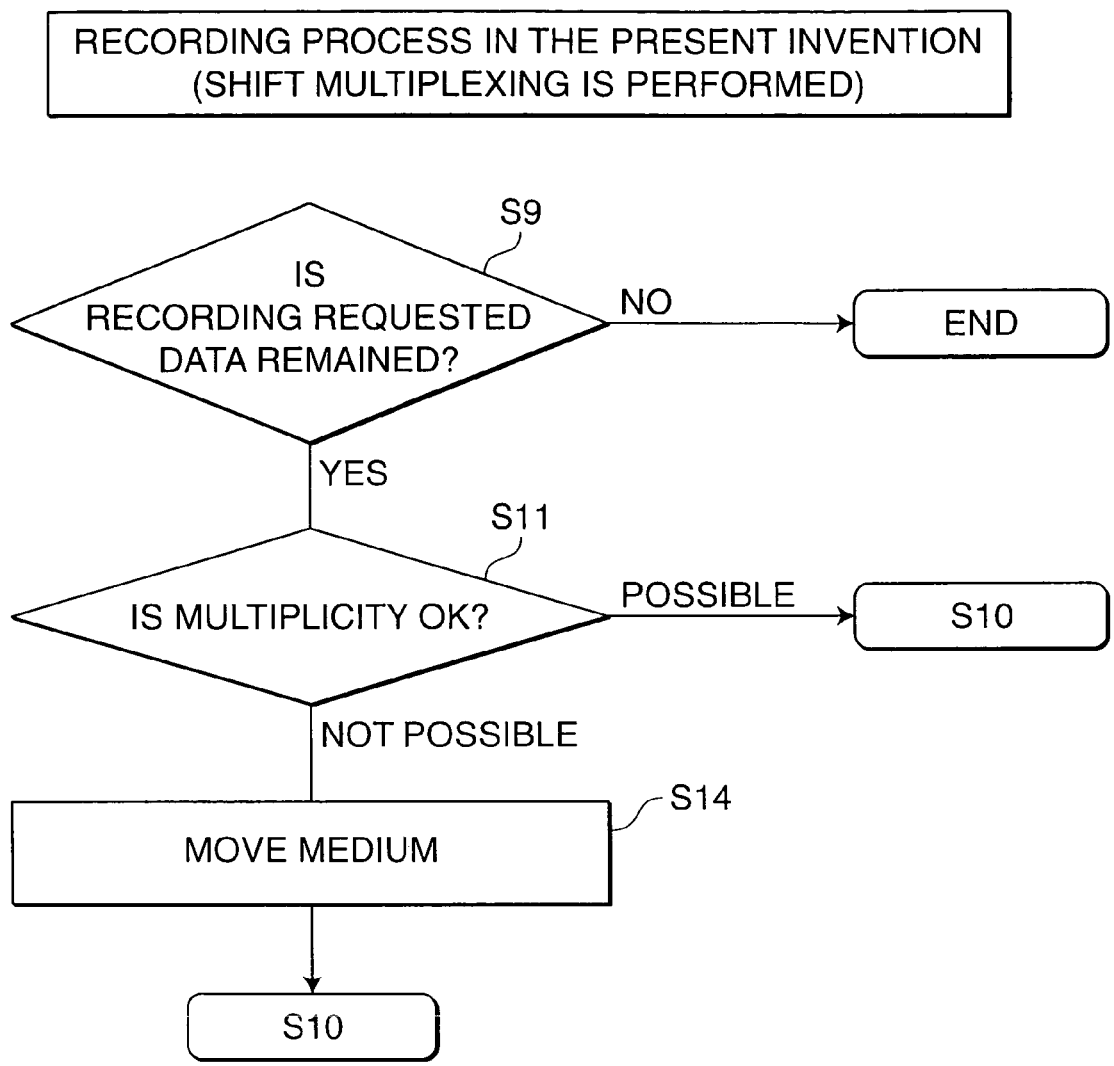

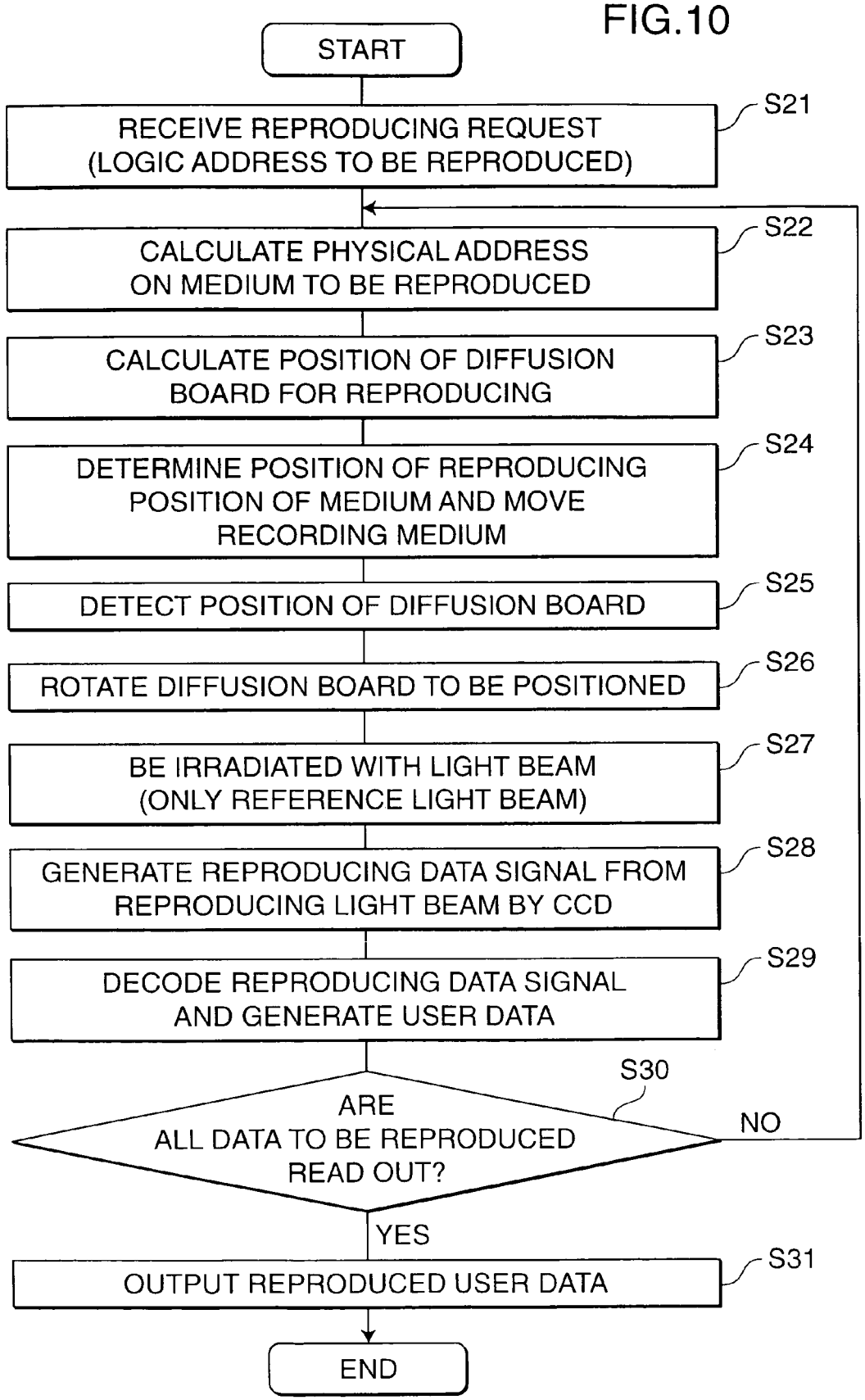

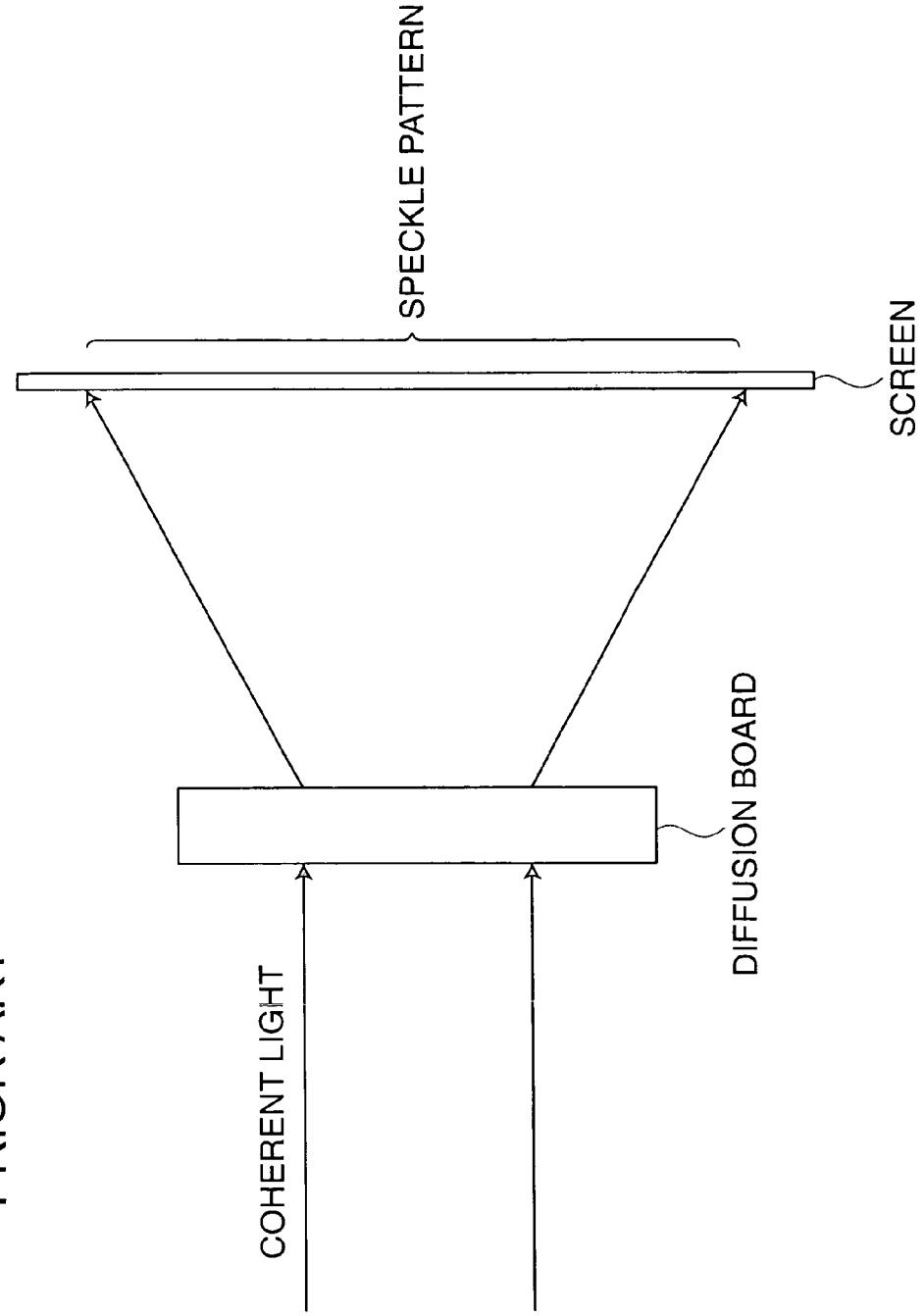

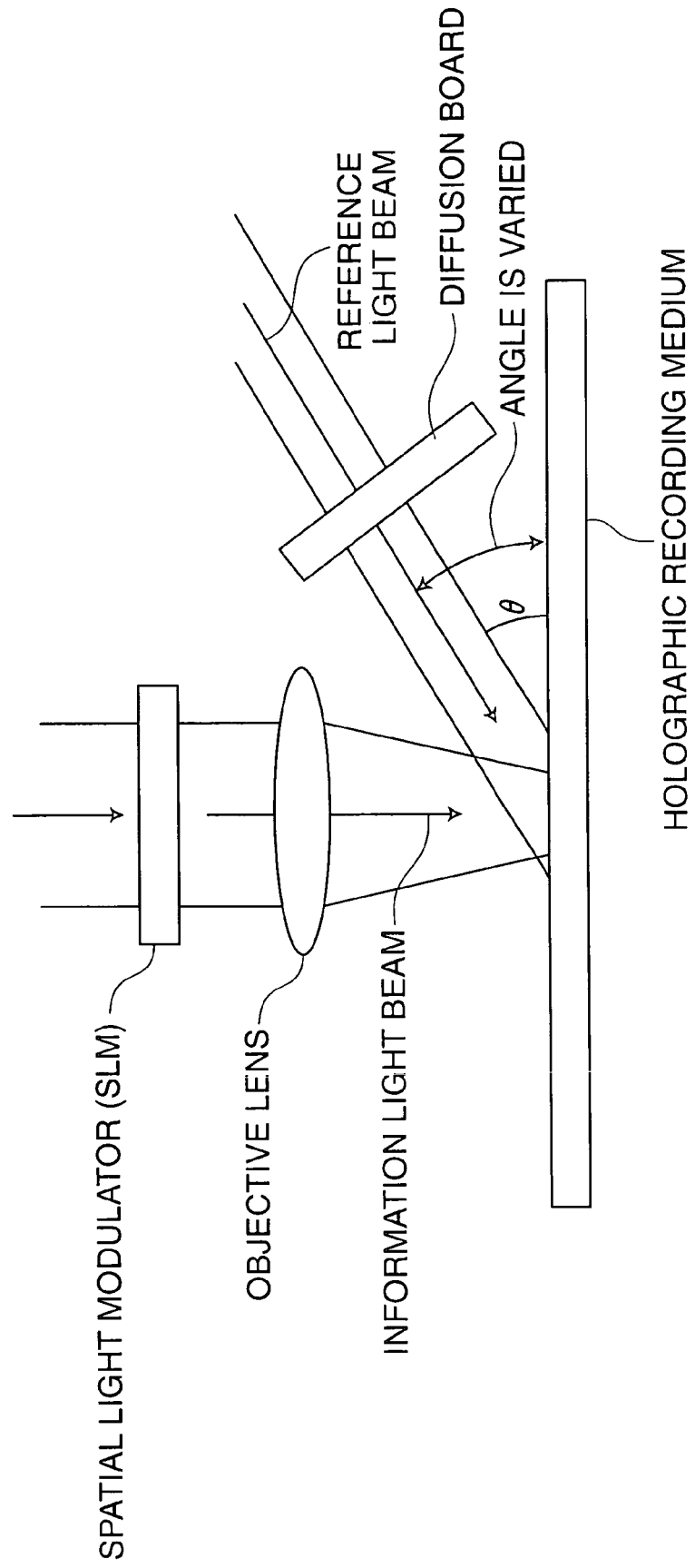

RECORDING AND REPRODUCING APPARATUS

CROSS-REFERENCE TO RELATED APPLICATIONS

This application is related to Japanese patent application No 2005-310325 filed on Oct. 25, 2005, whose priority is claimed under 35 USC § 119, the disclosure of which is incorporated by reference in its entirety.

BACKGROUND OF THE INVENTION

1. Field of the Invention

The present invention relates to a recording and reproducing apparatus, and more particularly, to a recording and reproducing apparatus in which page data is multiply-recorded with a hologram by irradiating a holographic recording medium with an information light beam and a reference light beam at the same time.

2. Description of the Background Art

According to the recording and reproducing apparatus using the hologram, two-dimensional page data is recorded by irradiating a certain position of the holographic material layer of the holographic recording medium with an information light beam corresponding to the two-dimensional page data and a reference light beam at the same time.

The two-dimensional page data is recorded as an interference pattern of the two light beams (information light beam and reference light beam).

Meanwhile, page data recorded on the medium is reproduced by irradiating the medium with only the reference light beam and detecting its reflected light beam or a transmitted light beam (referred to as a reproducing light beam also) in a two-dimensional image device (CCD, for example).

According to the holographic recording method, since the page data is recorded as the interference pattern, a plurality of page data can be recorded in the same recording region by multiple recording. As a method of the multiple recording, various kinds of methods such as angular multiplexing, frequency multiplexing, phase multiplexing, and shift multiplexing have been proposed In addition, as one aspect of the multiple holographic recording, a method using a speckle pattern is proposed.

The speckle pattern is a pattern formed on a screen when a coherent light beam is passed through a diffusion board as shown in FIG. 11 (refer to Applied Optics I, written by Tadao Tsuruta, Baifukan Inc., July in 1990, p. 244).

The diffusion board is a transparent board comprising fine indented patterns on its surface and it is an optical element which varies the phase of the coherent light beam when it transmits the light beam.

How the speckle pattern is distributed on the screen depends on the random nature of the indented pattern on the surface of the diffusion board. According to the holographic recording, the diffusion board is irradiated with the reference light beam and the speckle pattern of the reference light beam is used in recording and reproducing processes. The speckle pattern is used to improve angular selectivity or recording multiplicity when information is recorded by multiple recording.

FIG. 12 is a schematic explanatory diagram showing angular multiple recording in conventional holographic recording.

Here, only a constitution in the vicinity of a holographic recording medium of a holographic recording and reproducing apparatus is shown.

A light beam emitted from a light source is divided into two by a beam splitter (not shown), and one laser beam (referred to as an information light beam or an object light beam) is applied to a spatial light modulator (SLM) and passed through an objective lens and applied to the medium in almost the perpendicular direction.

The other light beam (referred to as a reference light beam) is passed through the mirrors and a diffusion board and applied to the medium at an angle θ.

The information light beam and the reference light beam are applied to the medium at the same time and different information can be recorded in the same position of the medium by varying the irradiation angle θ of the reference light beam.

Referring to FIG. 12, although the angular multiple recording can be performed by varying the irradiation angle θ of the reference light beam without the diffusion board, when the reference light beam is patterned with speckles by the diffusion board, angular selectivity can be improved. In other words, an amount of information which can be multiplied in the same position can be increased.

Referring to FIG. 12, in order to implement the angular multiplexing, a position or an angle of the mirror arranged in the way of a light path of the reference light beam has been adjusted with an actuator conventionally.

FIG. 13 is a schematic explanatory diagram when multiple recording is performed using both shift multiplexing and speckle multiplexing in the conventional holographic recording.

Points in which an information light beam and a reference light beam are used and a SLM and an objective lens are provided are the same as in FIG. 12. In addition, a mechanism to move a medium in the lateral direction in the drawing with respect to the SLM and the objective lens is provided to perform the shift multiplexing in FIG. 13.

In addition, in order to perform speckle multiplexing, there is provided a mechanism (linear moving mechanism using a stepping motor or a piezo element, for example) to move a diffusion board in a direction vertical to an optical axis of the reference light beam as shown in FIG. 13.

In this case, the multiple recording can be performed in a certain recording position of the medium by moving the diffusion board linearly little at a time, which is called the speckle multiplexing.

In addition, after the recording by the speckle multiplexing in the same recording position, recording is performed in the position which partially overlaps with the position in which the recording was performed by the speckle multiplexing, by slightly moving the position of the medium in the lateral direction, which is called the shift multiple recording.

Then, when the diffusion board is moved and the recording is further performed by the speckle multiplexing in the position after the medium was slightly moved, since the speckle multiplexing is performed in addition to the shift multiplexing, recording multiplicity of information can be further improved.

As one of documents disclosing multiple recording, there is known Japanese Unexamined Patent Publication No. 2002-216359.

However, according to the conventional recording and reproducing apparatus, a problem lies in reproducibility of the position of the diffusion board. For example, according to the angular multiplexing, although the information can be recorded by multiple recording by only varying the irradiation angle θ of the reference light beam slightly, when certain recorded page data is to be reproduced contrary, an irradiation angle $θ_1$ at the time of recording has to be equal to an irradiation angle $\theta_2$ at the time of reproducing precisely. Even when the $\theta_2$ is different from the $\theta_1$ slightly, a reproducing error could be generated.

In addition, as shown in FIG. 13, when the shift multiplexing and the speckle multiplexing are combined, moving control of the medium and moving control of the diffusion board have to be performed with high precision. Even when the position of the medium can be correctly determined, if the reproducing process is performed in a state the position of the diffusion board is slightly shifted from the position at the time of recording, a reproducing error is generated.

That is, the moving control and positioning of the diffusion board has to be performed with high precision so that the position at the time of recording may be the same as the position at the time of reproducing, which needs a high degree of positioning control.

In addition, when the two movement controls are to be performed with high precision, a control circuit size becomes large, costs becomes high and it takes time to control the movement.

However, when a data transfer speed at the time of recording and reproducing is to be improved, it is necessary to shorten a time for moving the position of the diffusion board or the medium, so that it is very difficult to implement high reproducibility of the diffusion board and the like.

Especially, when the recording and reproducing are performed using the speckle pattern to improve the recording multiplicity, since it is necessary to provide the diffusion board in the way of a light path of the reference light beam, it is essential to implement more correct position reproducibility of the diffusion board in order to ensure improvement of reliability of recording and reproducing or promptness of the reproducing process in addition to improvement of recording capacity.

SUMMARY OF THE INVENTION

The present invention provides a recording and reproducing apparatus including a light source to emit a laser beam; an information light beam irradiation unit to irradiate a holographic recording medium with an information light beam modulated from the laser beam so as to be related to recording requested information; and a reference light beam irradiation unit to irradiate the same position as the position irradiated with the information light beam on the medium with a reference light beam generated from the laser beam so as to form a specific speckle pattern on the medium, wherein the reference light beam irradiation unit comprises a diffusion board provided in the way of a light path through which the laser beam is passed and generating the reference light beam, a rotation controller to rotate the diffusion board, and an identification information detector to detect identification information previously formed on a surface of the diffusion board, the diffusion board comprises a plurality of encode storage regions in which different identification information is formed and a plurality of diffusion pattern generation regions specified by the identification information, the laser beam is converted to the reference light beam to form a specific speckle pattern, in the diffusion pattern generation region, and the reference light beam irradiation unit controls the diffusion board, based on the identification information detected by the identification information detector such that the diffusion board is rotated by the rotation controller and a desired diffusion pattern generation region comes to a light path through which the laser beam is passed while the laser beam is outputted.

Thus, since the position of the diffusion board is controlled based on the identification information formed in the diffusion board, the reference light beam having a desired speckle pattern can be correctly generated at the time of recording and reproducing, so that a recording error or a reproducing error can be reduced and recording reliability and reproducing reliability can be improved as compared with the conventional example.

BRIEF DESCRIPTION OF THE DRAWINGS

FIG. 1 is an explanatory diagram of multiple recording using a diffusion board according to the present invention;

FIG. 2 is a view showing a constitution of a recording and reproducing apparatus according to one embodiment of the present invention;

FIG. 4 is a block diagram showing a constitution of the recording and reproducing apparatus according to the present invention;

FIG. 6 is an explanatory diagram showing identification information stored in an encode storage region according to one embodiment of the present invention;

FIG. 9 is a flowchart showing shift multiple recording of the recording and reproducing apparatus according to the present invention;

FIG. 10 is a flowchart showing a reproducing process of the recording and reproducing apparatus according to one embodiment of the present invention;

FIG. 11 is an explanatory diagram showing a conventional speckle pattern;

FIG. 12 is an explanatory diagram showing conventional angular multiple recording.

DESCRIPTION OF THE PREFERRED EMBODIMENT

Figure 3A:
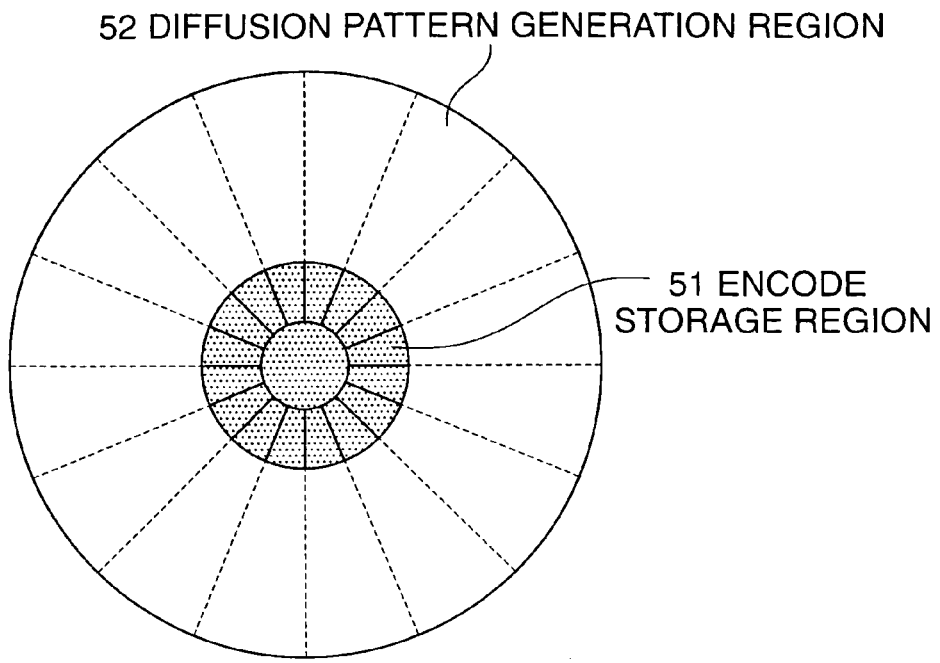
FIGS. 3(a) and 3(b) are an explanatory view showing a constitution example of a surface of the diffusion board according to the present invention.

It is an object of the present invention to improve reliability of recording and reproducing in an apparatus which performs holographic recording and reproducing using a speckle pattern, by devising a configuration, a structure and positioning control of a diffusion board.

The present invention provides a recording and reproducing apparatus including a light source to emit a laser beam; an information light beam irradiation unit to irradiate a holographic recording medium with an information light beam modulated from the laser beam so as to be related to recording requested information; and a reference light beam irradiation unit to irradiate the same position as the position irradiated with the information light beam on the medium with a reference light beam generated from the laser beam so as to form a specific speckle pattern on the medium, wherein the reference light beam irradiation unit comprises a diffusion board provided in the way of a light path through which the laser beam is passed and generating the reference light beam, a rotation controller to rotate the diffusion board, and an identification information detector to detect identification information previously formed on a surface of the diffusion board, the diffusion board comprises a plurality of encode storage regions in which different identification information is formed and a plurality of diffusion pattern generation regions specified by the identification information, the laser beam is converted to the reference light beam to form a specific speckle pattern, in the diffusion pattern generation region, and the reference light beam irradiation unit controls the diffusion board, based on the identification information detected by the identification information detector such that the diffusion board is rotated by the rotation controller and a desired diffusion pattern generation region comes to a light path through which the laser beam is passed while the laser beam is outputted.

Further, the recording and reproducing apparatus of the present invention further includes a recording controller to record user data on a holographic recording medium, and characterized in that the recording controller specifies a position on the medium in which the user data is to be recorded, specifies a diffusion pattern generation region A through which the laser beam emitted at the time of recording is to be passed, controls a position of the diffusion board such that the specified diffusion pattern generation region A comes to a light path through which the laser beam is passed while the laser beam is outputted, and outputs the laser beam from the light source.

Furthermore, a reproducing controller to reproduce user data recorded on a holographic recording medium is provided, and the reproducing controller specifies a position on the medium in which the user data to be reproduced is recorded, specifies a diffusion pattern generation region B through which the laser beam emitted at the time of reproducing is to be passed, controls a position of the diffusion board such that the specified diffusion pattern generation region B comes to a light path through which the laser beam is passed while the laser beam is outputted, and outputs the laser beam from the light source.

Moreover, a reproducing controller to reproduce user data recorded on the holographic recording medium is provided, and the reproducing controller specifies a position on the medium in which the user data to be reproduced is recorded, detects the diffusion pattern generation region A which was specified by the recording controller at the time of recording, controls a position of the diffusion board such that the specified diffusion pattern generation region A comes to a position through which the laser beam is passed while the laser beam is outputted, and outputs the laser beam from the light source. Thus, when reproducing is performed especially, reproducibility of the position of the diffusion board used at the time of recording can be improved as compared with the conventional example, so that reproducing reliability can be improved.

In addition, it is characterized in that different indented patterns are formed in the plurality of diffusion pattern generation regions of the diffusion board so that different speckle patterns are formed on the medium by the laser beam through those regions.

Further, it is also characterized in that identification information having address information which can specify each diffusion pattern generation region is formed in the encode storage region of the diffusion board.

Embodiments of the present invention will be described with reference to the drawings hereinafter. In addition, the present invention is not limited to the following embodiments

[Constitution of Recording and Reproducing Apparatus in the Present Invention]

FIG. 1 is a schematic explanatory view showing a holographic recording and reproducing apparatus according to one embodiment of the present invention.

FIG. 2 is a schematic view showing a constitution of the holographic recording and reproducing apparatus according to the present invention.

FIG. 1 shows only a part in the vicinity of a medium of the holographic recording and reproducing apparatus shown in FIG. 2.

According to the present invention, a part of a laser beam outputted from a light source 1 is applied to a spatial light modulator (SLM) 4 and applied to a holographic recording medium 9 through an objective lens 6 as an information light beam 24. The information light beam 24 is used in recording data and related to recording requested information (user data). In addition, the information light beam 24 is modulated by the SLM 4.

Meanwhile, a part of the laser beam outputted from the same light source 1 is applied to the same position as the irradiation position of the information light beam 24 on the medium through a mirror group 3 and a diffusion board 5 as a reference light beam 25.

When angular multiple recording is performed, an angle formed between the reference light beam 25 and the medium 9 is varied.

In addition, when shift multiple recording is performed, the position of the medium 9 is shifted in the lateral direction with respect to the optical components such as the SLM 4, the objective lens 6 and the diffusion board 5.

According to the present invention, a disk-shaped diffusion board is used as the diffusion board 5, and it is characterized in that speckle multiple recording is performed with the diffusion board 5 rotated.

The diffusion board 5 is provided in the way or a light path of the laser beam and transmits the laser beam and converts the laser beam to the reference light beam 25 to form a specific speckle pattern on the medium. The diffusion board 5 comprises a diffusion pattern generation region 52 to generate the reference light beam to form the speckle pattern, and an encode storage region 51 in which encoded data (referred to as identification information also) to specify the position of the diffusion board 5 is recorded on its surface. A constitution of the surface of the diffusion board 5 will be described below.

In general, when the pattern of the region 52 of the diffusion board through which the light beam is passed is different, the reference light beam 25 applied to the medium 9 has a different speckle pattern. Therefore, when the speckle pattern formed on the medium is different, since an interference condition with the information light beam 24 is different, different information can be recorded by multiple recording at the same position of the medium, which is called speckle multiple recording.

According to the present invention, the diffusion board 5 is rotated to form different speckle patterns. The diffusion board is rotated by a spindle motor 41 (diffusion board rotating mechanism) similar to the medium 9.

In addition, in order to form the different speckle patterns, the surface of the diffusion board 5 is divided into N regions and one diffusion pattern generation region 52 and one encode storage region 51 to specify that region are provided in each divided region. Different indented patterns are formed on a surface of the divided regions 52. The laser beam emitted form the light source is to be inputted to only one diffusion pattern generation region 52. When the laser beam is passed through a specific region 52, it is converted to the reference light beam to form a specific speckle pattern.

In addition, in order to identify the position of each diffusion pattern generation region 52, identification information AD is previously fixedly recorded in the corresponding encode storage region 51.

The identification information comprises address information to specify the region 52.

Figure 3B:
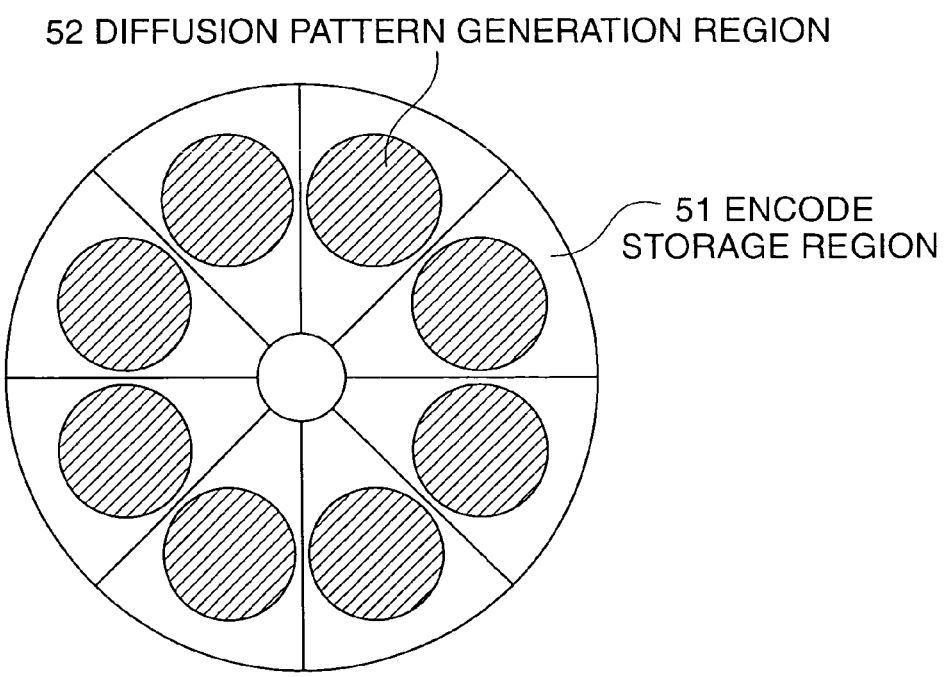

FIG. 3 shows a constitution of the surface of the diffusion board according to one embodiment.

FIG. 3(*a*) shows a constitution example in which the encode storage region 51 is provided in an inner periphery of the disk-shaped diffusion board 5, and a diffusion pattern generation region 52 is provided on the entire surface around the region 51. Here, the diffusion board 5 is divided into 16 regions (N=16).

Referring to FIG. 3(*a*), both encode storage region 51 and diffusion pattern generation region 52 radiate outward, and one diffusion pattern generation region can be specified by identification information AD which have been previously recorded in the encode storage region 51.

In addition, FIG. 3(*b*) shows a constitution example in which a surface of the diffusion board 5 is radially divided into 8 from the center and the encode storage region 51 and the diffusion pattern generation region 52 are provided in each divided region.

In FIG. 3(*b*), it is assumed that the diffusion pattern generation region 52 is larger than a diameter of a spot of the reference light beam 25. The encode storage region 51 may be provided at the different position from the diffusion pattern generation region 52 in each divided region.

For example, when it is assumed that there are 50 encode storage regions 51 in the diffusion board, address information AD1 is fixedly recorded in the first encode storage region 51 as the identification information, and address information AD50 is fixedly recorded in the 50th encode storage region 51. In addition, there is only one diffusion pattern generation region 52 which is previously related to the address information AD1.

When information is recorded or reproduced, its identification information is specified, the identification information recorded in the encode storage region 51 is searched to detect a specified AD and the diffusion board 5 is rotated so that the laser beam is applied to the diffusion pattern generation region 52 corresponding to the specified identification information AD.

In order to detect the specified identification information AD, a detector 40 for reading the identification information is provided as will be described below. The detector 40 comprises a light emitting element such as an LED and a photodetector (light receiving element), for example. According to the present invention, the diffusion board 5 is rotated and the identification information AD fixedly recorded in the region 51 of the diffusion board is read out, and the region 52 through which the laser beam is to be passed is specified based on the identification information AD and when the laser beam is emitted, the position of the diffusion board 5 is controlled such that the specified region 52 comes to the light path through which the laser beam is passed at the time of recording or reproducing.

Therefore, when speed control to rotate the diffusion board 5, timing to read the identification information AD and timing to emit the reference light beam at the time of recording or reproducing are related to each other, since the position of the diffusion board can be correctly specified, position reproducibility can be improved as compared with the conventional one.

That is, reliability of recording and reproducing can be improved by ensuring identity on the diffusion board at the time of recording and reproducing.

Next, a constitution of the recording and reproducing apparatus according to one embodiment of the present invention will be described with reference to FIGS. 2 and 4.

Referring to FIG. 2, the apparatus according to the present invention mainly comprises the light source 1, a beam splitter 2, the mirror 3, the spatial light modulator (SLM) 4, the diffusion board 5, the objective lens 6, a collective lens 7, a CCD 8.

In addition, the holographic medium 9 is fixed on a stand, and rotated by a spindle motor 42 (medium rotating mechanism). The diffusion board 5 is also rotated by the spindle motor 41 (diffusion board rotating mechanism).

The diffusion board 5 is made of quartz glass or polycarbonate, and a random indented pattern is formed on the surface in the diffusion pattern generation region 52. The indented pattern is formed by etching in the case of the quartz glass and by a mold in the case of the polycarbonate, for example.

In addition, a pattern of identification information is fixedly formed on the surface of the encode storage region 51 every divided region in the diffusion board.

In order to read out the identification information recorded in the encode storage region 51, the identification information detector 40 is provided in the vicinity of the diffusion board 5. According to the identification information detector 40, an incorporated LED is turned on and off and the light reflected from the region 51 in the diffusion board is received by the photodetector to detect the identification information, for example.

The laser beam emitted from the light source is divided into two light beams by the beam splitter (BS). One light beam is applied to the mirror 3, reflected by the mirror 3, passed through the diffusion board 5 and applied to the medium 9. This light beam is the reference light beam 25 and used for recording and reproducing.

According to the present invention, after the laser beam is passed through the diffusion board 5, the medium 9 is irradiated with the speckle patterned reference light beam 25.

The other beam is applied to the spatial light modulator (SLM) 4 and passed through the spatial light modulator (SLM) 4 and the objective lens 6 and applied to the medium 9. This light is the information light beam 24 (or object light beam) and used for recording.

When the spatial light modulator (SLM) 4 receives a two-dimensional recording pattern 22 which corresponds to two-dimensional page data which is requested to be recorded, it modulates the laser beam from the beam splitter 2 to a light beam having brightness variation which is related to the above requested page data.

When the page data is recorded, a specified recording region A1 on the medium is irradiated with the information light beam 24 and the reference light beam 25 at the same time and the page data is recorded as an interference pattern of the light beams.

In addition, when different page data is recorded in the recording region A1 by multiple recording, a two-dimensional recording pattern corresponding to the different page data is applied to the spatial light modulator 4 and the diffusion board 5 is rotated and the light beam is passed through a different diffusion pattern generation region 52.

In order to match the timing to output the laser beam to become the information light beam 24 and the reference light beam 25 with the timing to determine the position of the rotating diffusion board 5, a synchronous pattern (clock information) which has been previously recorded in the encode storage region of the diffusion board 5 is used. For example, synchronous patterns which have been recorded in the encode storage region of the diffusion board at regular intervals are read out by the identification information detector 40 and the light beam to become the information light beam 24 and the reference light beam 25 is emitted from the light source 1 after a lapse of a certain period after the synchronous pattern was detected.

Here, the term "after a lapse of a certain period" means a time when the specific region 52 in the diffusion board 5 comes to a just position through which the reference light beam 25 is passed.

When the page data which has been recorded in the medium 9 already is reproduced, first, a physical address on the medium in which the page data is recorded is found from a logic address contained in the recording request, and the medium 9 is moved such that the reference light beam 25 may be applied to the recorded position of the physical address.

Then, a position of the diffusion pattern generation region 52 of the diffusion board 5 which was used when that page data was recorded is calculated. Which diffusion pattern generation region 52 is used for a physical address A is defined in a physical format of the medium.

More specifically, referring to a format table stored in a memory mounted on a drive, the diffusion pattern generation region 52 to be used is read out from the format table and while the position of the encode storage region 51 related to that region 52 is confirmed by the detector 40, the diffusion board 5 is rotated such that the diffusion pattern generation region 52 may be irradiated with the laser beam for reproduction.

As described above, after the position of the medium and the position of the diffusion board are specified, the laser beam is outputted from the light source 1 and applied only to the mirror 3, and the position of the diffusion board is controlled such that the specific region 52 of the diffusion board comes to a light path of the laser beam when the laser beam is passed through the diffusion board, and the medium 9 is irradiated with the reference light beam 25 only. The information light beam 24 is not used at the time of reproducing.

Referring to FIG. 2, the reference light beam 25 is passed through the medium 9 and the recorded region of the page data and inputted to the CCD 8 through the collective lens 7. The light beam passed through the medium 9 is called a reproducing light beam 26.

The information corresponding to the recorded page data is contained in the reproducing light beam 26 and a two-dimensional image corresponding to the page data is formed in the CCD 8. When the two-dimensional image is converted to an electrical signal and decoded, the page data which was requested to be reproduced is reproduced (read out).

FIG. 4 is a block diagram showing the constitution of the recording and reproducing apparatus according to one embodiment of the present invention. Here, the recording and reproducing apparatus is shown such that it is divided into functional blocks, and parts regarding the data recording process, the data reproducing process, and the rotation controlling process are mainly shown. However, the present invention may comprise a constitution other than this.

In addition, although each component may be implemented by a hardware such as a logic circuit, its function may be implemented by a microcomputer comprising a CPU, a RAM, a ROM, a timer, an I/O controller and the like, and a program stored in the RAM or ROM.

For example, a modulation unit 32, a recording control unit 33, a reproducing control unit 34, a reproducing signal detection unit 35, a demodulation unit 36 can be implemented by collaboration with the microcomputer and the control program.

In addition, referring to FIGS. 2 and 4, the SLM 4 and the objective lens 6 corresponds to an information light beam irradiation part through which the information light beam modulated from the laser beam is applied to the holographic recording medium. In addition, referring to FIGS. 2 and 4, the mirror 3, the diffusion board 5, the identification information detector 40, the diffusion board rotation control unit 38, a diffusion board decoder 39, the spindle motor 41, and a part of the recording control unit and the reproducing control unit correspond to a reference light beam irradiation part.

According to the present invention, the recording medium 9 in which the recording and reproducing are performed is the holographic recording medium.

The holographic recording medium 9 is a medium in which a holographic material layer having a thickness of about 2mm is formed on a glass substrate and when the holographic material layer is irradiated with the information light beam and the reference light beam emitted from the same light source at the same time, an interference pattern is formed in the holographic material layer by the two light beams and the information is recorded with this interference pattern.

In FIG. 4, a data input unit 31, the modulation unit 32, the recording control unit 33 and the SLM 4 are parts related to the recording process of the data mainly, and other functional blocks are related to the data reproducing process.

However, the diffusion board 5, the diffusion board rotation control unit 38 and the diffusion board decoder 39 and the identification information detector 40 which are characteristic to the present invention are related to both recording and reproducing processes.

Referring to FIG. 4, the data input unit 31 is a part which receives a recording request 60 and user data 21 to be recorded or a recording address from a higher level device such as a personal computer.

The modulation unit 32 decodes the received user data 21 and adds an error correction code according to need to convert it to a form of the recording pattern 22 to be applied to the spatial light modulator (SLM) 4.

The recording control unit 33 applies the converted user data to the spatial light modulator (SLM) 4 and controls the positions of the light source, the lens, the mirror and the like shown in FIG. 2 such that the laser beam is emitted from the light source 1, the medium 9 is irradiated with the information light beam 24 and the reference light beam 25 to record the user data in the medium 9.

In addition, at the time of recording, the recording control unit 33 specifies the diffusion pattern generation region A through which the laser beams is passed, based on the identification information obtained from the diffusion board decoder 39 and applies a rotation amount of the diffusion board to the diffusion board rotation control unit 38. The diffusion board rotation control unit 38 comprises the spindle motor 41 shown in FIG. 2 and operates the spindle motor 41 according to the applied rotation amount to rotate the diffusion board 5.

At the time of recording, the laser beam is passed through the diffusion pattern generation region A positioned by the rotation, and the speckle-patterned reference light beam 25 is applied to the medium 9.

When recording of certain page data is requested, which diffusion pattern generation region 52 in the diffusion board 5 is used is uniquely determined by the physical format, for example.

When the reproducing control unit 34 receives a reproducing request 61 from the higher level device, it finds a physical address on the medium to be reproduced, and controls the positions of the light source, the lens, the mirror and the like such that the laser beam is emitted from the light source 1 and the medium 9 is irradiated with only the reference light beam 25 to reproduce the user data recorded in the medium.

In addition, similar to the recording control unit 33, the reproducing control unit 34 specifies a diffusion pattern generation region B (52) through which the laser beam is to be passed, based on identification information obtained from the diffusion board decoder 39 and applies a rotation amount of the diffusion board 5 to the diffusion board rotation control unit 38. In order to read out the page data to be reproduced, the specified region B (52) has to be equal to the diffusion pattern generation region A (52) specified when the page data was recorded. Therefore, the rotation amount of the diffusion board 5 is calculated such that the diffusion pattern generation region A (52) of the diffusion board which was used when the page data was recorded is irradiated with the laser beam and it is applied to the diffusion board rotation control unit 38.

When the medium 9 is irradiated with the reference light beam 25 at the time of reproducing, the reproducing light beam 26 corresponding to the holographic pattern recorded in that irradiation position is generated. The reproducing light beam 26 is received by the CCD 8.

The reproducing signal detection unit 35 generates an electrical reproducing data signal 27 corresponding to the reproducing light beam 26 received by the charge coupled device (CCD).

The demodulation unit 36 performs an error correction decoding process and the like to the reproducing data signal 27 and demodulates it to original form of user data 29.

The data output unit 37 transfers the user data 29 read out from the medium 9 to the higher-level device 62 such as the personal computer.

The identification information detector 40 is arranged so as to be opposed to the encode storage region 51 of the diffusion board 5, and reads out the identification information previously formed in the region 51.

As described above, the identification information is to specify the position of the divided region 52 and the rotation of the diffusion board 5 is controlled such that the diffusion pattern generation region 52 related to the region 51 is irradiated with the light beam, based on the information.

The identification information contains information to generate the synchronous signal, information to generate a reference clock (VFO information, address information to specify a position of the region 51 of the diffusion board, a sector mark showing a head of the address information and the like.

The identification information is formed on the surface of the diffusion board and comprises the indented patterns, for example.

The identification information detector 40 detects the indented patterns formed according to a certain rule in the region 51 of the diffusion board, and applies electrical pulse signals corresponding to the series of the indented patterns to the diffusion board decoder 39. The diffusion board decoder 39 extracts identification information from the pulse signal. The extracted identification information is sent to the recording control unit 33 or the reproducing control unit 34.

Figure 5:
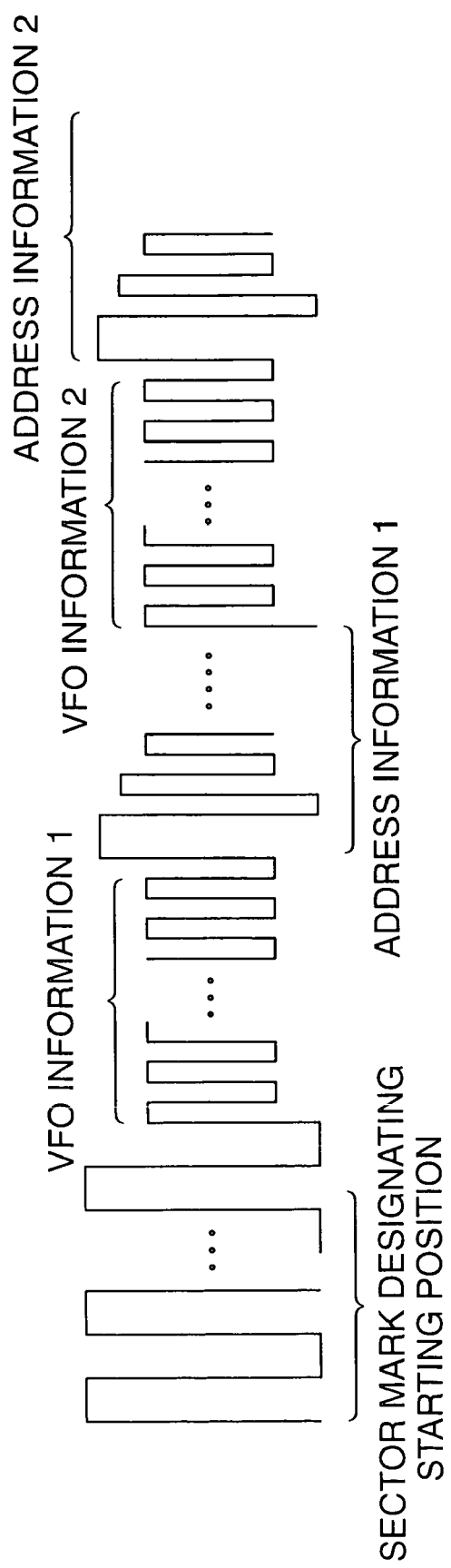
FIG. 5 is an explanatory diagram showing identification information stored in an encode storage region according to one embodiment of the present invention.

FIG. 5 is an explanatory view showing identification information obtained from the pattern previously stored in the encode storage region 51 of the diffusion board previously according to one embodiment of the present invention.

The identification information shown in FIG. 5 is in the form of data used in a photo-magnetic recording medium. That is, patterns corresponding to a sector mark, VFO information 1, address information 1, VFO information 2, and address information 2 are recorded in this order in one region 51.

The sector mark designates the head of the region 51 and the detector 40 detects the sector mark first, to confirm the existence of the region 51.

The VFO information is a part in which the patterns to generate the pulse-shaped reference clock are recorded and the detector 40 generates a reference clock to read the next address information based on the VFO information.

The address information is a part in which position information (an address number, for example) is recorded to specify the region 51 and a physical position of the region 51 of the diffusion board is specified from this information and a position of the diffusion pattern generation region 52 related to the region 51 in a radius direction or a peripheral direction is found.

The reason why the two sets of the VFO information and the address information are provided is to surely read out the address information. For example, when the readout address information 1 coincides with the readout address information 2, it is determined that the address information was correctly read out. When they do not coincide with each other, the two address information are read out again. However, according to the VFO information and the address information, only one set of them may be stored.

FIG. 6 is an explanatory view showing identification information according to another embodiment of the present invention.

Here, pits to generate synchronous signal are provided in the vicinity of an outer periphery of the diffusion board 5. The pits are formed at regular intervals.

In addition, address information to specify the region 51 is recorded in each region 51. The address information may be one or more. It is preferable the address information may be provided two or more to read out the address information correctly.

While the diffusion board 5 is rotated at a certain speed, the detector 40 detects the pit and generates the synchronous signal. When the synchronous signal is multiplied, a reference clock to read out the address information is generated.

Although two embodiments of the identification information stored in the region 51 are shown, the present invention is not limited to this, and another pattern may be formed. For example, a method (wobbling) in which grooves are formed meanderly as the identification information may be used.

[Recording Process in the Present Invention]

Next, a flow of the recording process in the recording and reproducing apparatus according to one embodiment of the present invention will be described.

Figure 7:
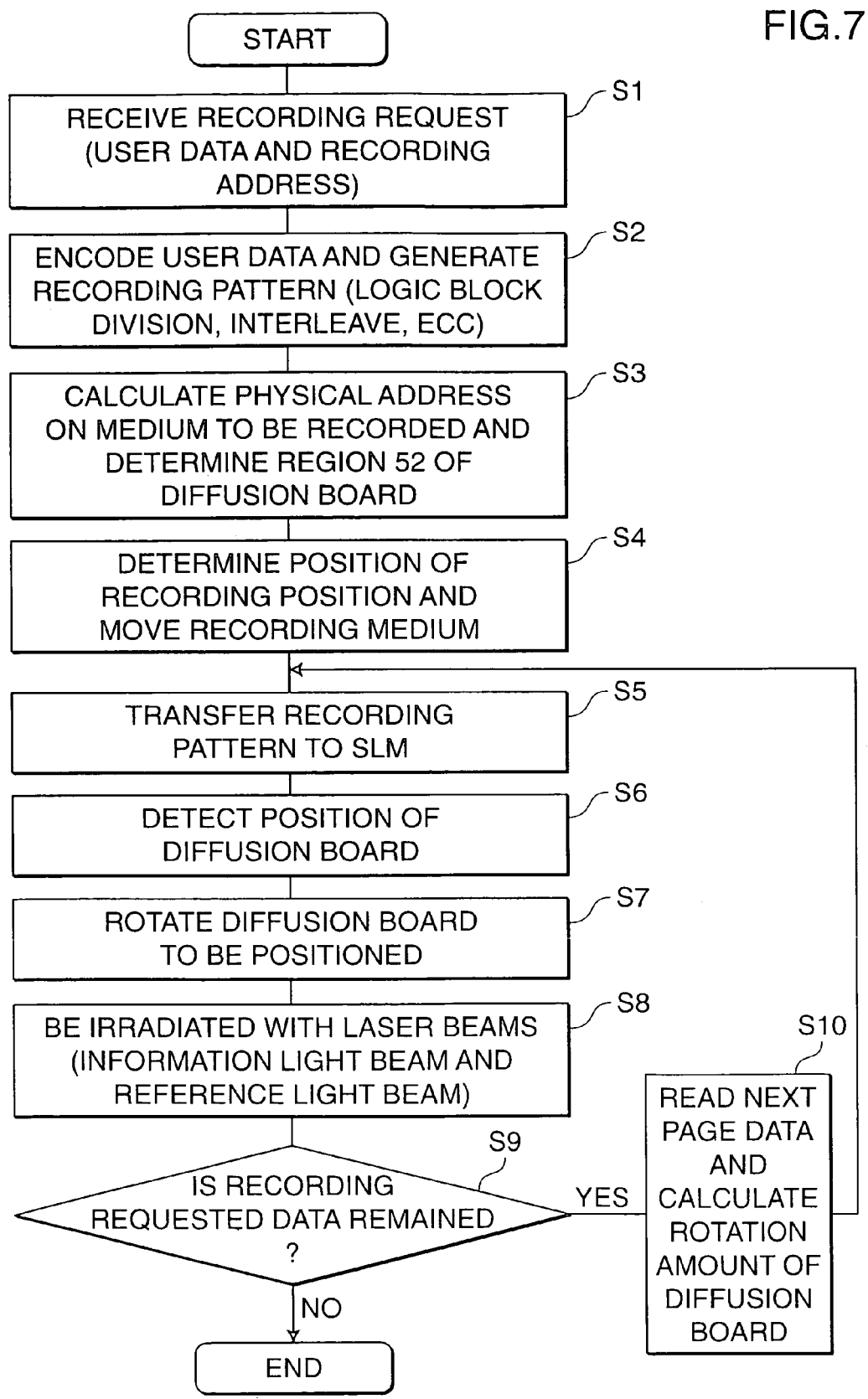
FIG. 7 is a flowchart showing a recording process of the recording and reproducing apparatus according to one embodiment of the present invention.

FIG. 7 is a flowchart showing the recording process of the recording and reproducing apparatus in the present invention.

First, at step S1, the data input unit 31 receives the recording request 60 of the user data 21 from the higher-level device such as the personal computer.

The recording request 60 contains the user data 21 to be recorded, the logic address in which the data is to be recorded and the like. At this time, the contents of the recording request 60 is temporally stored in the RAM and the like.

At step S2, the modulation unit 32 encodes the received user data 21. Here, when the user data amount is great, the user data is divided into a plurality of logic blocks so that the page data is divided and recorded.

In addition, the data is interleaved and an error correction code (ECC) is added according to need. The encoded user data is converted to the form of recording pattern 22 so as to be applied to the SLM 4.

At step S3, the recording control unit 33 calculates a physical address on the medium in which the user data is to be recorded, based on the logic address contained in the recording request 60. Thus, in a case the medium 9 is in the form of a disk, for example, the position of the medium 9 in the radius direction and the periphery direction can be determined.

In addition, the recording control unit 33 determines (specifies) the diffusion pattern generation region 52 to be used to pattern the reference light beam 25 with speckles. Here, which region 52 in the regions 52 of the diffusion board 5 is used is uniquely determined by the physical format of the medium.

At step S4, the recording control unit 33 operates the medium moving mechanism to move the medium 9 and positions (specifies) a recording position of the medium so that the user data 21 is recorded in the physical address determined at the step S3, that is, so that the position of the medium corresponding to the physical address is irradiated with the information light beam 24 and the reference light beam 25.

At step S5, the recording control unit 33 transfers the recording pattern 22 generated at the step S2 to the SLM 4. Here, a fine aperture corresponding to the recording pattern is set in the SLM 4.

At step S6, the recording control unit 33 detects a position of the diffusion board 5 so that the specific region 52 may be irradiated with the laser beam at the time of recording.

Here, the diffusion board 5 is rotated at a certain speed and a synchronous signal and address information recorded in the region 51 of the diffusion board is read out by the identification information detector 40. The readout information is decoded by the diffusion board decoder 39 and sent to the recording control unit 33. The recording control unit 33 confirms the decoded information and recognizes where the specific region 52 exists.

At step S7, a rotation speed of the diffusion board or timing to output the laser beam is calculated such that the recognized specific region 52 of the diffusion board may be irradiated with the laser beam. In addition, in a case the laser beam is applied after the rotation of the diffusion board 5 is stopped, the diffusion board 5 is rotated until the specified region 52 comes to the light path through which the laser beam is to be passed and stopped.

At step S8, the laser beam is emitted from the light source 1. The laser beam is split by the beam splitter 2 and the information light beam 24 and the reference light beam 25 are applied to the recording position on the medium 9 positioned at the step S4 through respective light paths.

Here, the reference light beam 25 is applied to the medium 9 through the specific region 52 of the diffusion board determined at the step S3. In case that the diffusion board 5 is continued to be rotated at a certain speed, the laser light is outputted for a certain period according to the timing when the region 52 comes just to the position through which the reference light beam is passed.

When the medium is irradiated with the information light beam and the reference light beam, the user data is recorded in the specified position of the medium with the interference pattern. Here, one page data corresponding to the recording pattern 22 transferred to the SLM 4 is recorded in the medium 9.

At step S9, it is checked whether remaining page data which is not recorded yet exists in the user data to be recorded.

In case that the user data is divided into the logic blocks at the step S2, since the recording process is performed every page data corresponding to one logic block, the recording process is performed a plurality of times. In case that the recording-requested user data is divided into five logic blocks, for example, the user data is divided into five page data and recorded. When it is assumed that the number of the page data which can be recorded in one recording region is five (multiplicity=5), the five page data is recorded in the same recording region by multiple recording by repeating the operations from the step S5 to S8 five times.

When there is no remaining page data at step S9, that is, when the requested user data is all recorded, the recording process is completed.

Meanwhile, there is remaining page data, the operation proceeds to step S10 and the page data to be recorded next is read out and a rotation amount of the diffusion board 5 is calculated to perform speckle multiplexing.

Then, the operation is returned to the step S5 and the series of operations from the step S5 to S8 are carried out and the readout page data is recorded in the same position of the medium 9.

As described above, by repeating the operations from the step S5 to S10 for all of the page data, the recording requested user data is recorded in the medium 9.

However, when the user data has a size which exceeds the number of the page data which can be recorded in one recording position on the medium by the speckle multiple recording, the medium is moved and its remaining page data is recorded in a different recording position.

Figure 8:
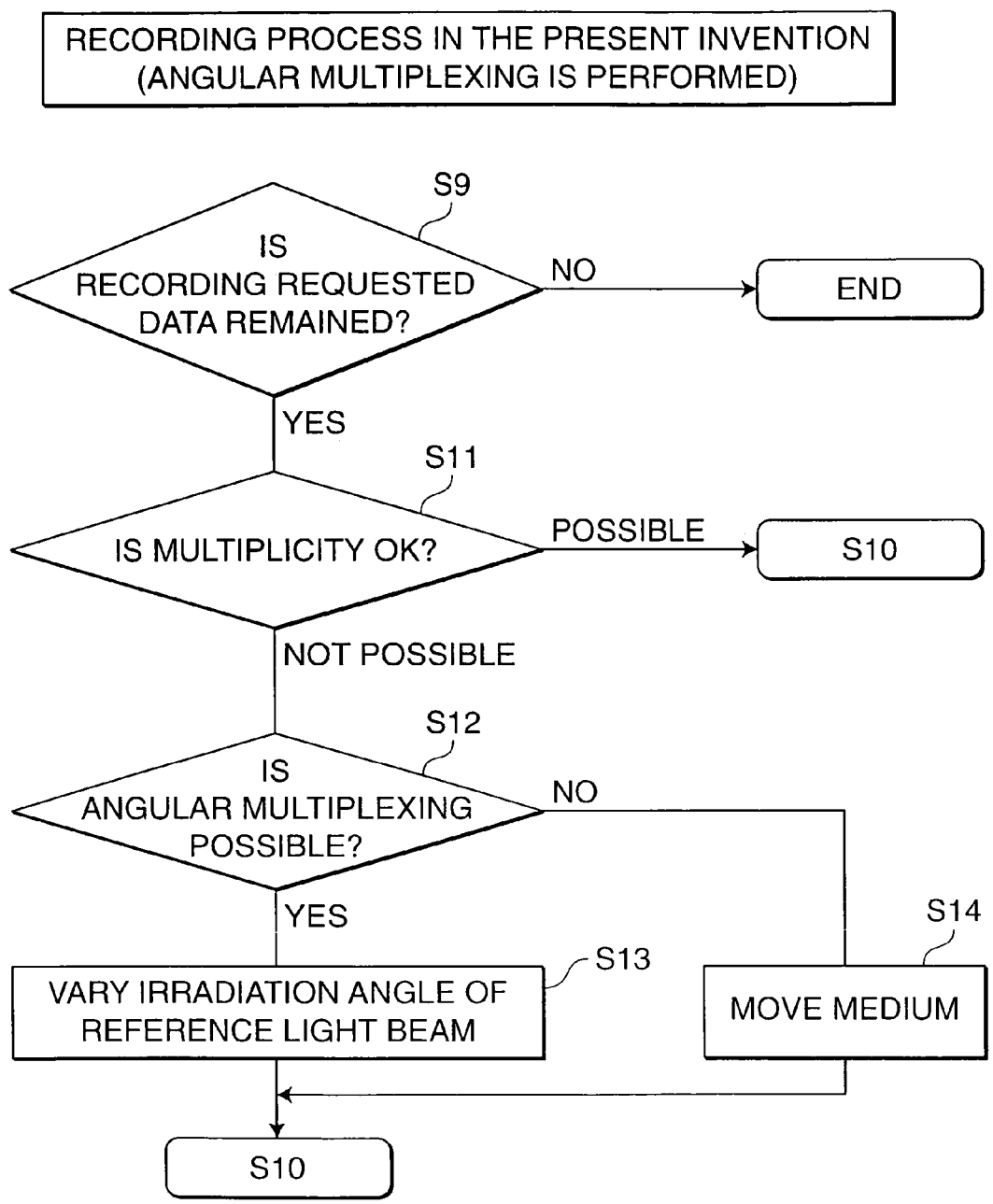
FIG. 8 is a flowchart showing angular multiple recording of the recording and reproducing apparatus according to the present invention.
Figure 13A:
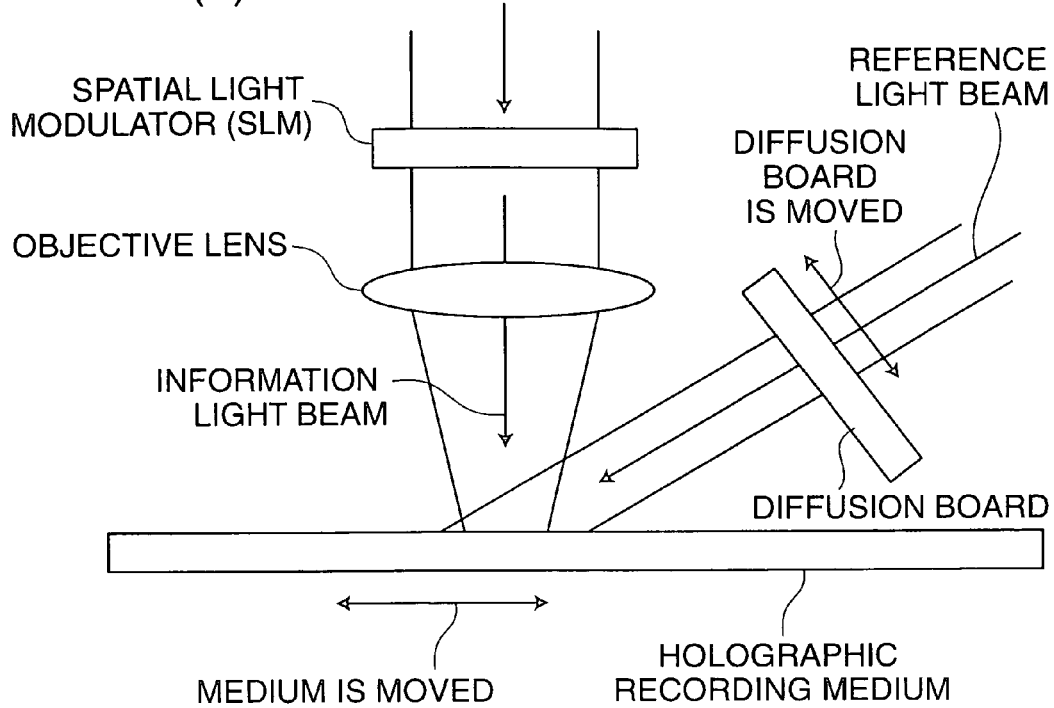
FIGS. 13 (a) and (b) are an explanatory diagram showing conventional shift multiplexing and speckle multiplexing.
Figure 13B:
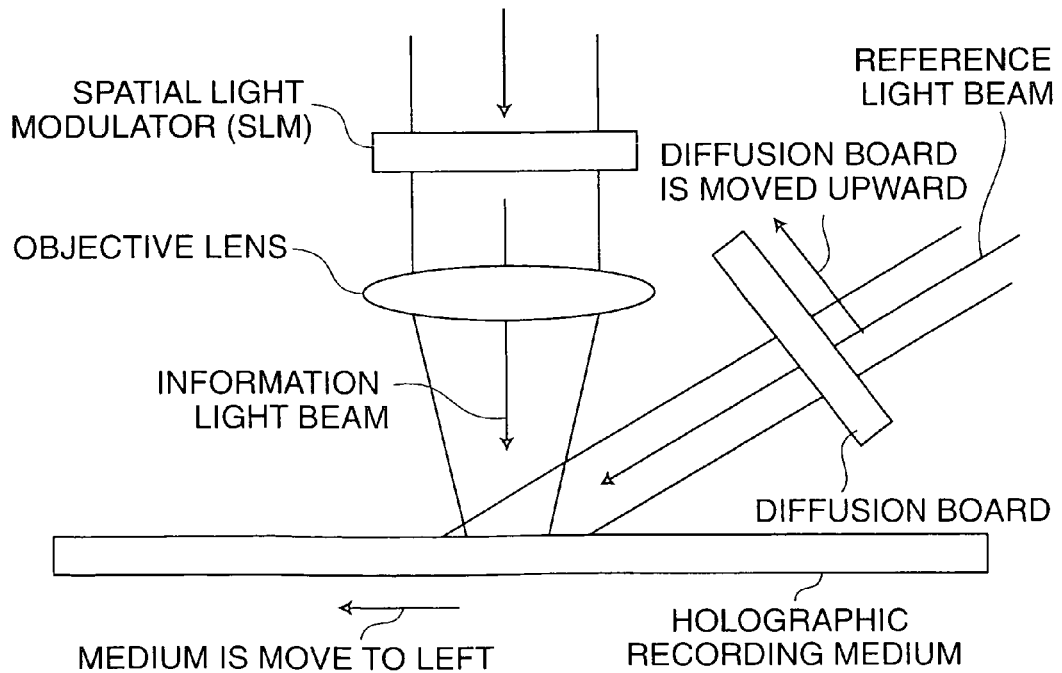

FIG. 8 is a flowchart showing a recording process according to the present invention when angular multiplexing is also performed.

FIG. 8 only shows the operations after the step S9. In this case also, the operations from the step S1 to S8 shown in FIG. 7 are similarly performed.

At step 9 shown in FIG. 8, when there is remaining page data, the operation proceeds to step S11 and multiplicity which can be recorded by speckle multiplexing is confirmed.

For example, when it is assumed that the maximum multiplicity of the speckle multiplexing is 10 and the multiplicity recorded at the present is 6, since the remaining multiplicity is 4, it is determined that the multiple recording can be performed in the same position. In this case, the operation proceeds to step S10.

Meanwhile, the multiplicity (=10) recorded by the speckle multiplexing at present becomes the maximum multiplicity (=10), since the recording by speckle multiplexing cannot be performed in the position of the medium, the operation proceeds to step S12.

At step S12, it is determined whether angular multiplexing can be performed or not. That is, it is determined whether the recording can be performed by changing an irradiation angle formed between the reference light beam and the medium. For example, when the maximum multiplicity of the angular multiplexing is 5 and the multiplicity at present is 2, since the remaining multiplicity is 3, the angular multiplexing can be performed in the same position on the medium. At this time, the operation proceeds to step S13.

Meanwhile, when the multiplicity of the angular multiplicity at present is equal to the maximum multiplicity (=5), since the angular multiplexing cannot be performed any more, the operation proceeds to step S14.

At step S13, since the angular multiplexing can be performed, the recording control unit 33 varies the irradiation angle of the reference light beam. For example, an angle adjusting mechanism (not shown) is operated to vary an angle of the mirror 3. Then, the operation is returned to the step S10 and a series of speckle multiple recording processes is performed.

In addition, at step S14, since the angular multiplexing cannot be performed, the medium is moved to vary the recording position of the medium. Then, the operation is returned to the step S10 and the speckle multiple recording process is performed in a different recording position of the medium.

The recording process in case that the angular multiplexing is performed in addition to the speckle multiplexing has been described. In case that the diffusion board is divided into N regions and the speckle multiplexing is performed and an irradiation angle of the reference light beam is varied M times to perform the angular multiplexing, the multiple recording can be performed in one recording position on the medium M×N times.

In addition, recording can be performed by combining the speckle multiplexing with shift multiplexing.

FIG. 9 is a flowchart showing a recording process when the shift multiplexing is combined.

Although FIG. 9 shows operations after the step S9 in FIG. 7, the same operations from steps S1 to S8 FIG. 7 are also performed here.

Referring to FIG. 9, when there is remaining page data to be recorded, multiplicity of the speckle multiplexing is confirmed. This confirmation is the same as the multiplicity confirmation shown in FIG. 8. When the speckle multiplexing can be performed, the operation proceeds to step S10 and when it cannot, the operation proceeds to step S14.

At step S14, the medium 9 is moved to the adjacent recording position in which the shift multiplexing can be performed. Then, the operation is returned to the step S10 and a series of recording by the speckle multiplexing is performed in the moved recording position.

Thus, the multiplicity can be increased when the shift multiplexing is combined also.

[Reproducing Process According to the Present Invention]

Next, a flow of the reproducing process in the recording and reproducing apparatus according to one embodiment of the present invention will be described.

FIG. 10 is a flowchart showing the reproducing process of the recording and reproducing apparatus according to the present invention.

At step S21, the data input unit 31 receives the reproducing request 61 from the higher-level device such as the personal computer. At this time, the reproducing request 61 contains the logic address in which the user data to be reproduced is recorded and the like.

At step S22, the reproducing control unit 34 calculates a physical address on the medium in which the reproducing is performed based on the received reproducing request 61.

In addition, at step S23, a position of the diffusion board 5 at the time of reproducing is calculated.

That is, the region 52 of the diffusion board is specified when the laser beam is passed through the diffusion board 5 to reproduce the user data in the requested logic address.

The region 52 is the same as the region 52 which was used when the user data was recorded. The region 52 to be used at the time of reproducing is uniquely determined by referring to the physical format of the medium.

At step S24, the reproducing position on the medium is determined (specified) based on the physical address found at the step S22. That is, the moving mechanism of the medium is operated to move the medium 9 so that the reproducing position corresponding to the physical address may be irradiated with the reference light beam 25.

At step S25, the diffusion board 5 is rotated and the position of the diffusion board 5 to be used is detected. Here, the identification information recorded in the region 51 of the diffusion board 5 is detected by the identification information detector 40 and the detected information is decoded by the decoder 39. The decoded information, that is, the address information, for example is sent to the reproducing control unit 34 and the position of the region 52 to be used for reproducing is recognized.

At step S26, the reproducing control unit 34 controls the rotation speed, the movement or the position of the diffusion board using the diffusion board rotation control unit 38 based on the recognized result at the step S25 so that the specific region 52 of the diffusion board may be irradiated with the reference light beam.

In case that the diffusion board is stopped when it is irradiated with the laser beam, the diffusion board 5 is rotated so that the specific region 52 of the diffusion board 5 may comes to the position through which the laser beam is to be passed.

At step S27, the laser beam is emitted from the light source 1. At this time, the light is not applied to the SLM 4 from the splitter 2. That is, the information light beam 24 is prevented from being applied to the medium 9 by inserting a light shielding board to block the light path of the information light beam, so that the medium 9 is irradiated with only the reference light beam 25.

The laser beam is passed through the mirror 3 and the specific region 52 of the diffusion board and applied to the determined position on the medium. At this time, since the reference light beam 25 is patterned with speckles according to the pattern of the specific region 52, only the page data recorded so as to be related to the speckle pattern is outputted from the position of the medium as the reproducing light beam 26.

That is, among the plurality of the page data recorded in the same position by the multiple recording, the reproducing light beam 26 having a specific pattern corresponding to the specific page data can be provided.

At step S28, the reproducing light beam 26 is received by the CCD 8.

The CCD 8 converts the two-dimensional light beam to an electric signal and sends it to the reproducing signal detection unit 35. The reproducing signal detection unit 35 generates a reproducing data signal 27 corresponding to the page data based on the electric signal.

At step S29, the demodulation unit 36 decodes the reproducing data signal 27. That is, it performs the reverse of the modulation unit 32 such as error correction by the ECC or a process to remove the added control data to demodulate the user data. In case that the user data is divided, only one page data is demodulated.

At step S30, it is confirmed whether all user data of the logic address to be reproduced are read out or not. When the page data which has not been read out exists, the operation is returned to the step S22 and the operations from the steps S22 to S29 are repeated to read the remaining page data.

After all data are read out, the operation proceeds to step S31 and the data output unit 37 outputs the reproduced user data to the higher-level device 62 such as the personal computer.

According to the reproducing process in one embodiment of the present invention, since the diffusion pattern generation region 52 to be used at the time of reproducing is determined using the identification information recorded in the region 51 of the diffusion board, the region 52 which is the same region 52 used at the time of recording can be irradiated with the reference light beam with high precision.

In addition, since the region 52 to be irradiated with the laser beam is determined by controlling the rotation of the diffusion board and using the identification information recorded in the diffusion board previously, position reproducibility of the diffusion at the time of recording and reproducing can be improved and reliability at the time of recording and reproducing can be improved.

According to the present invention, since the position of the diffusion board is controlled based on the identification information previously formed in the diffusion board, the reference light beam having the intended speckle pattern can be correctly generated and recording reliability and reproducing reliability can be improved as compared to before.

What is claimed is:

1. A recording and reproducing apparatus comprising:
a light source to emit a laser beam;
an information light beam irradiation unit to irradiate a holographic recording medium with an information light beam modulated from the laser beam so as to be related to recording requested information; and
a reference light beam irradiation unit to irradiate the same position as the position irradiated with the information light beam on the medium with a reference light beam generated from the laser beam so as to form a specific speckle pattern on the medium, wherein
the reference light beam irradiation unit comprises a diffusion board provided in the way of a light path through which the laser beam is passed and generating the reference light beam, a rotation controller to rotate the diffusion board, and an identification information detector to detect identification information previously formed on a surface of the diffusion board,
the diffusion board comprises a plurality of encode storage regions in which different identification information is formed and a plurality of diffusion pattern generation regions specified by the identification information,
the laser beam is converted to the reference light beam to form a specific speckle pattern, in the diffusion pattern generation region, and
the reference light beam irradiation unit controls the diffusion board, based on the identification information detected by the identification information detector such that the diffusion board is rotated by the rotation controller and a desired diffusion pattern generation region comes to a light path through which the laser beam is passed while the laser beam is outputted.

2. The recording and reproducing apparatus according to claim 1, further comprising:
a recording controller to record user data on a holographic recording medium, wherein
the recording controller specifies a position on the medium in which the user data is to be recorded, specifies a diffusion pattern generation region A through which the laser beam emitted at the time of recording is to be passed, controls a position of the diffusion board such that the specified diffusion pattern generation region A comes to a light path through which the laser beam is passed while the laser beam is outputted, and outputs the laser beam from the light source.

3. The recording and reproducing apparatus according to claim 1, further comprising:
a reproducing controller to reproduce user data recorded on a holographic recording medium, wherein
the reproducing controller specifies a position on the medium in which the user data to be reproduced is recorded, specifies a diffusion pattern generation region B through which the laser beam emitted at the time of reproducing is to be passed, controls a position of the diffusion board such that the specified diffusion pattern generation region B comes to a light path through which the laser beam is passed while the laser beam is outputted, and outputs the laser beam from the light source.

4. The recording and reproducing apparatus according to claim 2, further comprising:
a reproducing controller to reproduce user data recorded on the holographic recording medium, wherein
the reproducing controller specifies a position on the medium in which the user data to be reproduced is recorded, detects the diffusion pattern generation region A which was specified by the recording controller at the time of recording, controls a position of the diffusion board such that the specified diffusion pattern generation region A comes to a light path through which the laser beam is passed while the laser beam is outputted, and outputs the laser beam from the light source.

5. The recording and reproducing apparatus according to claim 1, wherein
different indented patterns are formed in the plurality of diffusion pattern generation regions of the diffusion board so that different speckle patterns are formed on the medium by the laser beam through those regions.

6. The recording and reproducing apparatus according to claim 1, wherein
identification information having address information which can specify each diffusion pattern generation region is formed in the encode storage region of the diffusion board.

* * * * *